US006560564B2

(12) United States Patent
Scarlat et al.

(10) Patent No.: US 6,560,564 B2
(45) Date of Patent: May 6, 2003

(54) SYSTEM AND METHODS FOR LOAD TESTING A TRANSACTIONAL SERVER OVER A WIDE AREA NETWORK

(75) Inventors: Yuval Scarlat, Cupertino, CA (US); Zohar Gilad, Sunnyvale, CA (US)

(73) Assignee: Mercury Interactive Corporation, Sunnyvale, CA (US)

( * ) Notice: Subject to any disclaimer, the term of this patent is extended or adjusted under 35 U.S.C. 154(b) by 0 days.

(21) Appl. No.: 10/192,816

(22) Filed: Jul. 8, 2002

(65) Prior Publication Data
US 2002/0177977 A1 Nov. 28, 2002

Related U.S. Application Data

(63) Continuation of application No. 09/484,684, filed on Jan. 17, 2000, now Pat. No. 6,477,483.

(51) Int. Cl.[7] ............................................. G06F 15/00
(52) U.S. Cl. ....................................................... 702/186
(58) Field of Search ................................. 702/186, 188, 702/182, 108, 122; 709/224, 217, 203, 200; 703/21, 22, 23, 13

(56) References Cited

U.S. PATENT DOCUMENTS

| 5,544,310 A | 8/1996 | Forman et al. | |
| 5,742,754 A | 4/1998 | Tse | |
| 5,774,660 A | 6/1998 | Brendel et al. | |
| 5,781,703 A | 7/1998 | Desai et al. | |
| 5,787,254 A | 7/1998 | Maddalozzo, Jr. et al. | |
| 5,812,780 A | 9/1998 | Chen et al. | |
| 5,819,066 A | 10/1998 | Bromberg et al. | |
| 5,881,268 A | 3/1999 | McDonald et al. | |
| 5,889,955 A * | 3/1999 | Shinozaki et al. | 709/224 |
| 5,918,004 A | 6/1999 | Anderson et al. | |
| 5,925,868 A | 7/1999 | Arends et al. | |
| 5,951,697 A * | 9/1999 | O'Donnel et al. | 714/37 |
| 5,956,491 A | 9/1999 | Marks | |
| 5,956,662 A * | 9/1999 | Hemker et al. | 702/182 |
| 6,002,871 A * | 12/1999 | Duggan et al. | 717/135 |
| 6,006,260 A | 12/1999 | Barrick, Jr. et al. | |
| 6,108,700 A | 8/2000 | Maccabee et al. | |
| 6,138,157 A | 10/2000 | Welter et al. | |
| 6,157,940 A | 12/2000 | Marullo et al. | |
| 6,167,534 A | 12/2000 | Straathof et al. | |
| 6,167,537 A * | 12/2000 | Silva et al. | 714/46 |

(List continued on next page.)

FOREIGN PATENT DOCUMENTS

| EP | 0 784 276 A1 | 7/1997 |
| EP | 0 889 418 A2 | 1/1999 |

OTHER PUBLICATIONS

Randall, N., "Web Site Analysis Tools: The Results Are In," PC Magazine, Mar. 10, 1998, pp. 188–210.

(List continued on next page.)

Primary Examiner—John Barlow
Assistant Examiner—Demetrius Pretlow
(74) Attorney, Agent, or Firm—Knobbe, Martens, Olson & Bear, LLP

(57) ABSTRACT

A load testing system comprises multiple load testing servers that are configured to apply a load to a target web site, or other target server system, remotely over the Internet. Using a web site associated with the system, a business entity can upload information (transactions to be tested, etc.) about a target server system to be tested. The business entity also preferably sets up a staged implementation of the target system. The uploaded information is used to generate and run one or more load tests against the staged system, and the results are stored in a database that is remotely browsable via various online reports and charts. The system includes a controller that permits an operator to assign load testing tasks to specific load testing servers. The controller preferably implements a load balancing algorithm to distribute a load associated with load test execution events among the load testing servers.

33 Claims, 2 Drawing Sheets

U.S. PATENT DOCUMENTS

| | | | |
|---|---|---|---|
| 6,182,139 B1 | | 1/2001 | Brendel |
| 6,205,413 B1 | | 3/2001 | Bisdikian et al. |
| 6,219,803 B1 | * | 4/2001 | Casella et al. ............... 714/38 |
| 6,243,832 B1 | * | 6/2001 | Eckes et al. ................. 714/33 |
| 6,243,862 B1 | | 6/2001 | Lebow |
| 6,247,050 B1 | | 6/2001 | Tso et al. |
| 6,249,886 B1 | | 6/2001 | Kalkunte |
| 6,260,065 B1 | | 7/2001 | Leiba et al. |
| 6,279,001 B1 | * | 8/2001 | DeBettencourt et al. ...... 707/10 |
| 6,295,557 B1 | | 9/2001 | Foss et al. |
| 6,317,786 B1 | * | 11/2001 | Yamane et al. ............ 709/224 |
| 6,317,787 B1 | | 11/2001 | Boyd et al. |
| 6,324,492 B1 | | 11/2001 | Rowe |
| 6,324,580 B1 | | 11/2001 | Jindal et al. |
| 6,336,138 B1 | | 1/2002 | Caswell et al. |
| 6,374,297 B1 | | 4/2002 | Wolf et al. |

OTHER PUBLICATIONS

Dalton, G., "Online Measurement—Keynote's service lets companies see what customers see," Information Week Online, May 10, 1999 (2 pages printed from Information-Week.com Web Site).

Killeelea, P., "Web Performance Measuring Tools and Services," Webreview.com, Jan. 15, 1999 (5 pages printed from Webreview.com web site).

Selected pages printed from Keynote.com Web Site on Aug. 27, 1999 (32 pages).

LoadRunner Controller User's Guide–Windows Version 5.01, Mercury Interactive Corporation (bound printout of online guide, 393 pages, undated).

Nolan, C., "A Look at e–Test Suite 3.1 by RSW," The Software Testing & Quality Engineering Magazine, date Jul./Aug. 1999.

Lozier, D., "A Proposed Software Test Service for Special Functions," U.S. Department of Commerce, Technology Administration, National Institute of Standards and Technology, pp. 1–11, dated Oct. 1996.

Rapoza, J., "Real–world testing abilities," eWEEK LABS REVIEW, dated Apr. 23, 1997.

International Search Report for PCT/US01/00628 (4 pages).

Mainkar, V., "Availability Analysis of Transaction Processing Systems based on User–Perceived Performance," Proc. Sixteenth Symp. On Reliable Distributed Systems, pp. 10–17, dated Oct. 1997.

* cited by examiner

SYSTEM AND METHODS FOR LOAD TESTING A TRANSACTIONAL SERVER OVER A WIDE AREA NETWORK

RELATED APPLICATIONS

This application is a continuation of allowed U.S. application Ser. No. 09/484,684, filed Jan. 17, 2000, now U.S. Pat. No. 6,477,489 the disclosure of which is hereby incorporated by reference.

FIELD OF THE INVENTION

The present invention relates to methods for testing the operation of web-based and other transactional servers.

BACKGROUND OF THE INVENTION

A variety of commercially-available software tools exist for assisting companies in testing the performance and functionality of their transactional servers and associated applications prior to deployment. (The term "transactional server" refers generally to a multi-user computer system, such as a web site, that provides interactive services to users over a computer network.) Examples of such tools include the LoadRunner®, WinRunner® and Astra QuickTest® products of Mercury Interactive Corporation, the assignee of the present application.

Using these products, a user can record or otherwise create a test script which specifies a sequence of user interactions with the transactional server. The user may also optionally specify certain expected responses from the transactional server, which may be added to the test script as verification points. For example, the user may record a session with a web-based travel reservation system during which the user searches for a particular flight, and may then define one or more verification points to check for an expected flight number, departure time or ticket price.

Test scripts generated through this process are "played" or "executed" to simulate the actions of users—typically prior to deployment of the component being tested. During this process, the testing tool monitors the performance of the transactional server, including determining the pass/fail status of any verification points. Multiple test scripts may be replayed concurrently to simulate the load of a large number of users. Using an automation interface of the LoadRunner product, it is possible to dispatch test scripts to remote computers for execution.

The results of the test are typically communicated to the user through a series of reports that are accessible through the user interface of the testing tool. The reports may contain, for example, graphs or charts of the observed response times for various types of transactions. Performance problems discovered through the testing process may be corrected by programmers or system administrators prior to deployment.

One type of test that is commonly performed prior to the deployment of a new or modified transactional server is a load test. A load test generally involves simulating the actions of relatively large numbers of users to determine how the transactional server will perform under heavy loads. One purpose of such a test is to determine the number of concurrent users the system can handle before performance becomes unacceptable—sometimes referred to as the "breaking point." The breaking point can be determined, for example, by scaling or ramping up the number of simulated users over time while monitoring server response times. One testing tool that provides functionality for performing load tests is the above-mentioned LoadRunner product of Mercury Interactive.

Some companies also offer hosted services for monitoring the post-deployment operation of web sites. Mercury Interactive, for example, provides a service known as Topaz ActiveWatch™ which monitors a deployed web site from various points of presence on the Internet on a 24-hour or other basis. The response times, transaction results, and other data collected through the monitoring processes are aggregated within a database for customer viewing, and are used to generate real-time notification messages when problems occur. These types of services generally do not provide load testing capabilities.

One problem companies commonly encounter is a need to load test a web site or other Internet-based system on very short notice. This problem commonly arises when a company is about to deploy its web site, or a new web site application, for the first time. For example, a company may wish to implement and launch its new e-commerce service quickly in order to be the first to market. Other situations in which this problem commonly arises include the following: (1) when the company expects a sudden increase in traffic as the result of promotions, new product offerings, a newsworthy event, or some other type of event, and (2) when the company upgrades or modifies an existing software component of the transactional server.

In these situations, a company may not have the time or other resources needed to set up, run and analyze the results of a load test prior to launch. For example, the company may not have the hardware resources needed to generate a sufficiently large load, or may not have the technical expertise needed to develop, run and analyze the load tests. The above-mentioned tools and services do not provide an adequate solution to this problem.

SUMMARY

The present invention overcomes the above and other problems by providing a hosted service for load testing a web site or other transactional server over the Internet or other public network. The service allows the owner or operator of a transactional server ("customer") to outsource the task of load testing a transactional server to a load testing service provider. The service provider tests the transactional server remotely from a server farm, based on information remotely collected from the customer, without the need to visit the customer's facility.

To use the service, the customer initially registers with the service provider—preferably through a web site of the service provider. As part of the registration process, the customer provides the information needed by the service provider to define load tests and generate associated scripts. This information may include, for example, an overview of the system architecture, anticipated traffic levels, and descriptions of the transactions to be tested.

To enable the service provider to access the transactional server over the Internet, the customer preferably sets up a substantially replicated version of the transactional server using a staging server. The staged transactional server may be placed at an Internet address that is not generally known to ordinary users (e.g., www.stage.abcstore.com), and/or may be placed behind a firewall to limit access. The use of a staging server allows the transactional server to be tested from a remote location prior to actual deployment, while allowing the customer to continue development using the non-staged version of the transactional server. To assist the customer in setting up the staged transactional server, the service provider's web site may include staging server software in downloadable form.

Using the transactional server and the information provided by the customer, the service provider uses conventional tools to remotely generate and run load tests of the transactional server. The load tests are preferably executed from a server farm that provides sufficient processing power to test multiple high-volume web sites concurrently. The results of the load test, including recommendations for reducing bottlenecks and other performance problems, may be communicated to the customer through the service provider's web site, by telephone, or by another communications method.

In one embodiment, the service provider makes a collaboration tool available that allows the customer, or a consultant of the customer, to remotely participate in the process of generating and running load tests.

BRIEF DESCRIPTION OF THE DRAWINGS

An illustrative embodiment of the invention will now be described with reference to the drawings, in which.

DETAILED DESCRIPTION OF AN ILLUSTRATIVE EMBODIMENT

Throughout this description, it will be assumed that the transactional server being tested is a web-based system or "web site" that is accessible via the Internet. It will be recognized, however, that the inventive methods can also be used to monitor other types of transactional servers, including those that use proprietary protocols or are accessible only to internal users of a particular organization. For example, the underlying methodology can also be used to monitor internal intranets, two-tier client/server systems, SAP R/3 systems, and other types of distributed systems.

Figure 1:
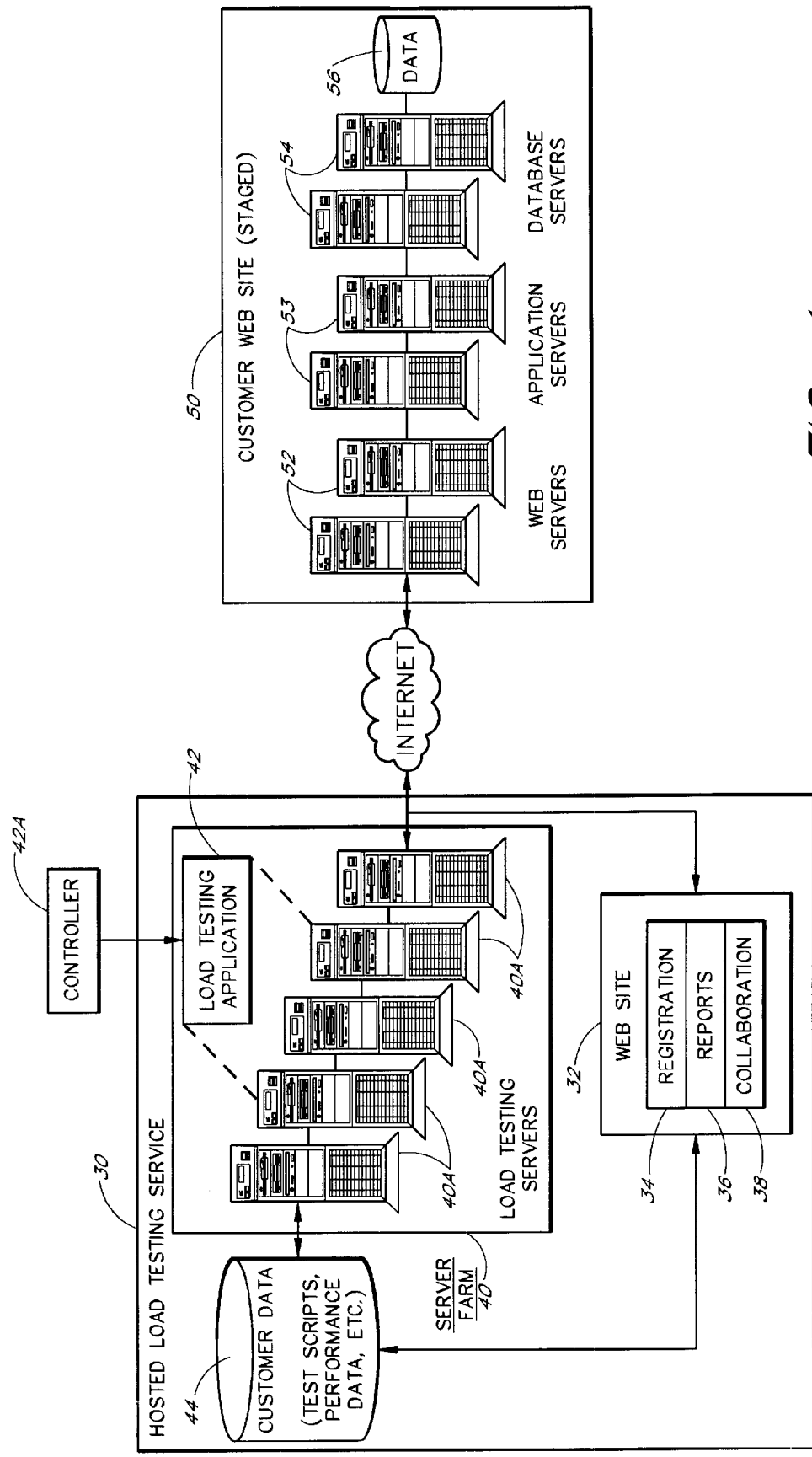
FIG. 1 illustrates the general architecture of a hosted load testing service according to the invention, and illustrates and example web site being tested by the service.

FIG. 1 illustrates the primary components of a system 30 that provides a hosted load testing service according to the invention. FIG. 1 also illustrates an example web site 50 that may be remotely load tested by the service. For purposes of the following description, the term "service provider" refers to the primary business entity that operates the load testing service, and the term "customer" refers to the primary business entity responsible for the operation of the web site 50.

As depicted in FIG. 1, the system 30 includes a service provider web site 32 that can be accessed by potential and existing customers of the service. The web site 32 includes a registration application 34 that provides functionality for entities to register to use the load testing service. Registration may alternatively be accomplished by telephone, email or other communications method. The web site 32 may also include a reports server 36 for allowing customers to review analysis reports and graphs generated during load test execution. In addition, the web site 32 may provide a hosted collaboration tool 38 for allowing the customer or a consultant to actively participate in the load testing process.

As further depicted in FIG. 1, the load testing service is implemented using an array or farm of servers 40 that host a load testing application 42. Each physical server 40A of the array is preferably capable of simulating the load of many thousands of concurrent users of the web site 50. The total processing power of the server farm 40 is preferably sufficient to concurrently stress multiple high-traffic web sites to or beyond the breaking point, so that multiple customers can be served simultaneously. The physical servers 40A are preferably interconnected by one or more local area networks (not shown) that connect the servers to a backbone of the Internet. In one implementation, the server farm includes 20 dual-processor, 500 MHz servers with 1 GB of memory and a bandwidth of 4 GB/second, and can deliver a system load equivalent to that of 100,000 concurrent users. Although all of the servers 40A are preferably located in a single location, some or all of the servers 40A could be distributed geographically.

The load testing application 42 is preferably the commercially-available LoadRunner® version 6.0 product of Mercury Interactive Corporation, although other load testing programs can be used. Using a controller component 42A of the load testing application 42, a human operator can remotely specify the load testing operations to be performed by each server 40A, including, for example, the number of virtual users to be used on each server, the transactions to be executed by each such virtual user, the performance parameters to be monitored, etc. Methods for setting up and executing load tests are well known in the art, and therefore are not described in detail herein. The controller 42A may optionally implement a load balancing algorithm which assigns load testing tasks (Vuser execution events, etc.) to individual load testing servers 40A so as to evenly distribute the processing load. The controller 42A may run on a separate computer that is remote from the server farm 40, such as at a remote development facility of the service provider.

The web site 32 and the load testing servers 40A access a database 44 of customer data. The information stored within this database 44 may include, for example, customer information provided during registration, test scripts and load testing scenarios developed by the service provider, raw performance data generated during test execution, and annotated performance charts and graphs prepared by the service provider for customer viewing. The database 44 may be implemented as a file server, a single database system, a set of distinct database systems, or another data storage scheme, and is shown as a single database largely for illustrative purposes.

As further illustrated in FIG. 1, the customer web site 50 is typically implemented physical web servers 52, application servers 53, database servers 54 and back-end databases 56. For load testing purposes, the web site 50 is preferably made accessible to the service provider using a staging server. Staging server software that can be used for this purpose is available from such companies as Netscape Corporation and Coast Software. The staging software may optionally be provided to customers in downloadable form on the service provider's web site 30.

The staged web site 50 is preferably a substantially replicated or mirrored version of the actual web site, or at least of the web site functionality to be tested. The same or a different set of physical servers 52–54 may be used to implement the staged and the actual implementations of the web site 50. It is desirable, however, that the processing power of the staged web site be approximately the same as that of the actual or anticipated web site. The staged web site 50 may be placed at a special Internet address (e.g., www.stage.abcstore.com) that is not generally known to users, and/or may be placed behind a firewall. One benefit of using a staging server for load testing is that the web site's components are generally isolated from damage during load testing. Another benefit is that the customer can continue development of the web site during load testing.

Figure 2:
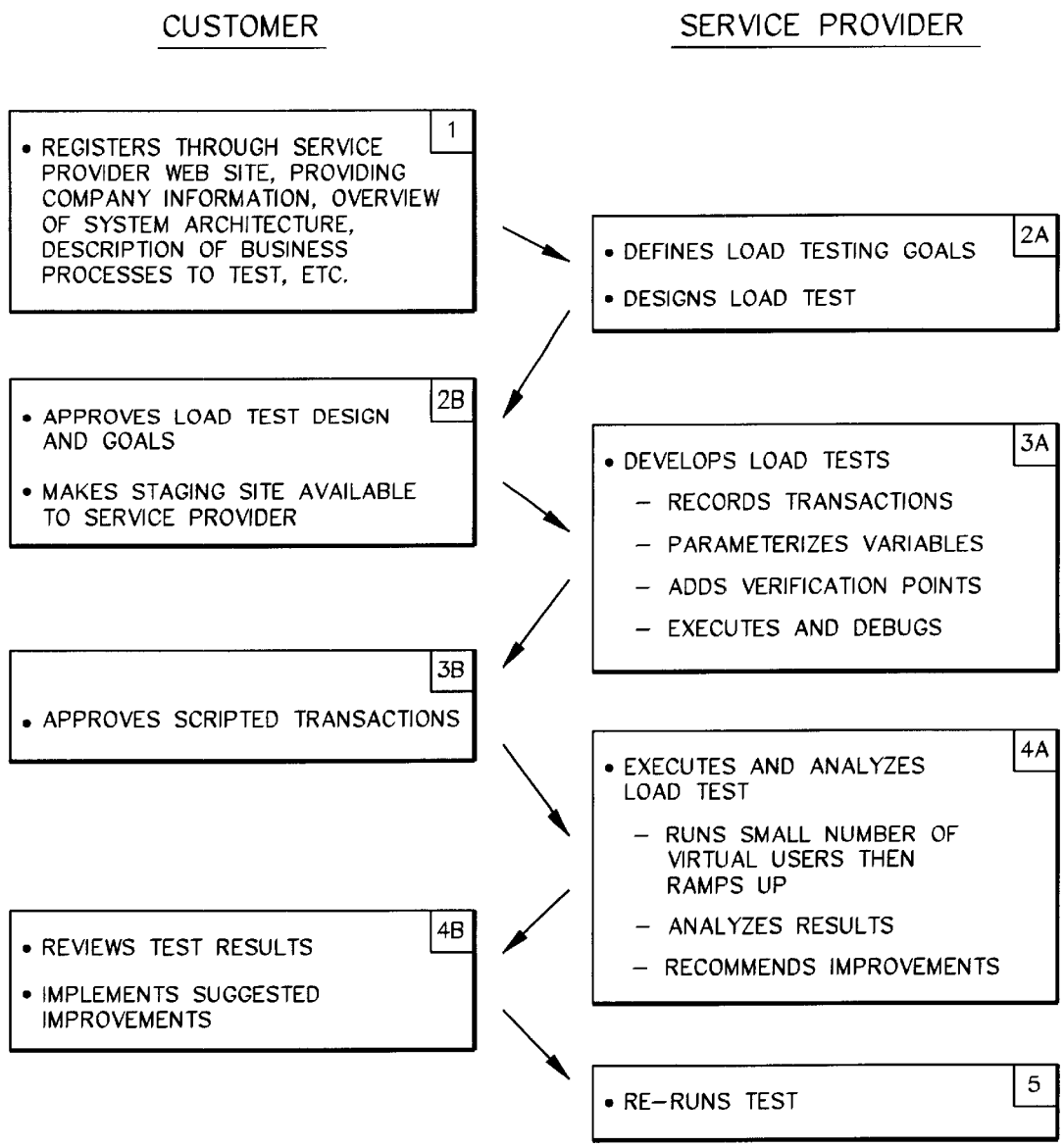
FIG. 2 illustrates the general sequence of steps that are performed by the customer and the service provider to load test a web site prior to deployment.

FIG. 2 illustrates a preferred business process used to implement the hosted service, with actions performed by the customer shown in the left-hand column and actions performed by the service provider shown in the right-hand column. The illustrated actions of the service provider are preferably performed by a team of load testing experts. Some or all of the illustrated communications between the customer and the service provider are preferably in the form of secure postings to the service provider's web site 32.

In step 1 of FIG. 2, the customer registers with the service provider. During registration, the customer may provide such information as the company name, payment information, a description of the web site and the associated transactions to be tested (including relevant URLs, username/password pairs, data values, etc.), a description of the web site's architecture, expected traffic levels, the expected launch date, details of any related Service Level Agreements (SLAs) with ISPs or others, and the class of load testing service desired (e.g., load testing only, load testing and functionality testing, etc.). Some or all of this information is preferably obtained through registration forms on the service provider's web site 32. The customer also preferably specifies a username and password for accessing a private area of the service provider's web site 32 that is used for communications and possibly collaboration between the customer and the service provider. As mentioned above, the information submitted by the customer is stored in the customer database 44.

The customer may also be required to pay some or all of the service provider's fees during the registration process, such as by entering a credit card number. The fees charged by the service provider may, for example, be based on one or more of the following example criteria, and may be calculated automatically based on the information provided by the customer: number of days until launch date, number of transactions to be tested, expected level of traffic, and whether or not web site functionality (content of server responses) will be tested. If the customer does not already have a staging server, the fees may also include a licensing fee for use of staging server software provided by the service provider.

As indicated by step 2a, the service provider uses the information provided by the customer to define testing goals and to design the load tests. The load testing designs and goals are preferably presented to the customer for approval, as depicted by step 2b. The customer may also make the staging site accessible to the service provider at this time.

As depicted by step 3a, the service provider then develops the load tests to be run against the staged site. The load test scripts are preferably recorded using a recorder component of LoadRunner 6.0, but could alternatively be generated manually or using other tools. Each script may represent a particular transaction or sequence of transactions to be performed by a virtual user. For example, a script for use with a merchant's web site may start out with an access to a search page, followed by a submission of a search query, followed by a selection of a search result item for viewing, followed by a purchase of the item. If server functionality is to be verified during load testing, the service provider may insert verification points that specify expected server responses, such as an expected order confirmation message from the transactional server. The service provider may also parameterize variables so that different data sets can be used on different iterations of the test script. Preferred methods for recording transactions, adding verification points and parameterizing variables are described in U.S. application Ser. No. 09/337,082, filed Jun. 21, 1999, which is hereby incorporated by reference. The service provider also executes and debugs the scripts. The script files, and the associated scenario files that specify how the scripts will be used to test the web site 50, are stored in the customer database 44 for subsequent use. As depicted by step 3b, the customer may approve the scripted transactions prior to actual testing.

In step 4a, the service provider then runs the load test against the staged web site 50 from the array of servers 40. The service provider preferably starts out with a relatively small number of virtual users and then ramps up this number over time. IP spoofing is preferably used to create a traffic pattern in which different simulated users have different IP addresses. During load test execution, the real-time monitors of the load testing application 42 isolate performance bottlenecks by splitting end-to-end transaction response times into separate components associated with the client, the network, and the servers. For example, a server monitor component (not shown) locates any problems associated with the web site's web servers 52, application servers 53, and database servers 54. Similarly, a network delay monitor (not shown) isolates network performance problems by breaking down the network topology between the client and the server and measuring the network delay along each segment.

The transaction response times and other performance data generated during load testing are aggregated within the customer database 44, and are reviewed and analyzed by the service provider using the various charts and reports provided by the load testing application 42. Some or all of the performance data may also be made available to the customer for viewing via the service provider's web site 32. In addition, as mentioned above, the customer or a consultant may be able to participate in the load testing process, such as by recording additional transactions or defining new execution scenarios, using a hosted collaboration tool 38 on the service provider's web site 32.

The results of the service provider's analysis may be communicated to the customer through the service provider's web site 32 (e.g., through annotated performance graphs and charts), by telephone, and/or by other communications method. As part of this process, the service provider will typically suggest modifications that will improve the performance of the web site 50. For example, the service provider might inform the customer that the web site's database servers 54 take too long to lock once the load reaches a certain level, or that the customer's ISP is violating a Service Level Agreement by providing insufficient throughput. As depicted by steps 4b and 5, once the customer makes any suggested changes to the staged web site 50, the service provider will typically re-run the load tests to evaluate the effects of the changes. Once load testing is complete, the service provider may make the test scripts and associated files available to the customer to use for post-deployment testing or monitoring of the web site 50.

Although the invention has been described in terms of one particular embodiment, other embodiments that are apparent to those of ordinary skill in the art, including embodiments which do not provide all of the features and advantages set forth herein, are also within the scope of this invention. Accordingly, the scope of the invention is defined by the claims that follow.

What is claimed is:

1. A system that provides functionality for remotely load testing target server systems over a wide area network, the load testing system comprising:

a plurality of load testing servers connected to the wide area network, said load testing servers hosting a load testing application that provides functionality for applying a load to a target server system over the wide area network and for monitoring response times of the target server system during application of said load;

a controller that provides functionality for controlling the plurality of load testing servers over a network connection to execute load tests of the target systems, wherein the controller provides functionality for a human operator to specify load testing operations to be performed by each of the plurality of load testing servers;

a database that is accessible to the plurality of load testing servers, the database storing test scripts that specify user transactions for load testing specific target server systems, and storing target system performance data generated by the load testing servers during execution of load tests; and a web site that provides secure access to at least some of the data stored in the database to enable users to remotely participate in load testing of the target server systems.

2. The system of claim 1, wherein the controller implements a load balancing algorithm that assigns load testing tasks to individual load testing servers so as to distribute a processing load.

3. The system of claim 1, wherein the controller runs on a computer that is remote from the plurality of load testing servers.

4. The system of claim 1, wherein the web site hosts a collaboration application that allows users to remotely participate in the development of load tests.

5. The system of claim 1, wherein the web site hosts a registration application that provides functionality for users to register to use the plurality of load testing servers to load test target server systems.

6. The system of claim 1, wherein the web site provides user access to said target system performance data to allow users to remotely analyze load test results data.

7. The system of claim 1, wherein the plurality of load testing servers are interconnected by a local area network.

8. The system of claim 1, wherein the plurality of load testing servers are arranged within a common server farm.

9. The system of claim 1, wherein the database stores load testing data for each of a plurality of customers of a load testing service associated with the plurality of load testing servers, and the web site provides each such customer secure access to the load testing data of that customer.

10. A method of providing load testing services to each of a plurality of business entities that operate transactional servers, the method comprising:

providing a web site through which the business entities upload data regarding specific transactional servers to be load tested;

generating load tests for each of the transactional servers using data uploaded by the corresponding business entities;

running each of the load tests from a server farm that is located remotely from the corresponding transactional server, such that request messages and responses thereto are passed between the server farm and each of the transactional servers over a wide area network;

storing performance data resulting from running the load tests in a database, said performance data indicative, for each transactional server, of how the transactional servers responds under load conditions; and providing web-based access to the performance data over the wide area network to allow said business entities to evaluate results of load test runs;

whereby computing resources used to conduct load tests are shared by the plurality of business entities, and the transactional servers of such business entities are load tested without a need for the business entities to set up load testing servers.

11. The method of claim 10, wherein running each of the load tests comprises ramping up a number of virtual users over time to increase a load applied to a transactional server.

12. The method of claim 10, wherein running each of the load tests comprises ramping up a load applied to a transactional server over time while monitoring associated server response times.

13. The method of claim 10, wherein running each of the load tests comprises running a load test against a staged implementation of a transactional server.

14. The method of claim 10, wherein running each of the load tests comprises running a load test against a staged implementation of a transactional server.

15. The method of claim 10, wherein running each of the load tests comprises using a load balancing algorithm to assign load testing tasks to individual servers of said server farm.

16. The method of claim 10, wherein at least some of the transactional servers are web site systems.

17. The method of claim 10, wherein generating the load tests comprises using a hosted collaboration tool remotely collaborate in load test generation.

18. A method of load testing a web site, the method comprising:

providing a staged implementation of the web site that is remotely accessible via the Internet;

running a load test against the staged implementation of the web site from a server farm that is remote from the web site and coupled to the web site by the Internet, wherein running the load test comprises ramping up a load applied to the staged implementation of the web site over time; and providing web-based access to performance data measurements taken during running of the load test to permit users to remotely analyze results of the load test.

19. The method of claim 18, wherein running the load test comprises using a load balancing algorithm to assign load testing tasks to individual servers of the server farm.

20. The method of claim 18, wherein running the load test comprises using a controller component to assign load testing tasks to individual servers of the server farm.

21. The method of claim 18, wherein providing a staged implementation of the web site comprises placing the staged implementation at an Internet address that is not generally known.

22. The method of claim 18, wherein ramping up a load comprises ramping up a number of virtual users accessing the staged implementation of the web site.

23. The method of claim 18, further comprising using a hosted collaboration tool to specify user transactions to be executed to load test the staged implementation of the web site.

24. A system that provides functionality for remotely load testing target server systems over a wide area network, the load testing system comprising:

a plurality of load testing servers connected to the wide area network, said load testing servers hosting a load testing application that provides functionality for applying a load to a target server system over the wide area network and for monitoring response times of the target server system during application of said load;

a controller that provides functionality for controlling the plurality of load testing servers over a network connection to execute load tests of the target systems;

a database that is accessible to the plurality of load testing servers, the database storing test scripts that specify user transactions for load testing specific target server systems, and storing target system performance data generated by the load testing servers during execution of load tests; and a web site that provides secure access to at least some of the data stored in the database to enable users to remotely participate in load testing of the target server systems;

wherein the controller implements a load balancing algorithm that assigns load testing tasks to individual load testing servers so as to distribute a processing load.

25. The system of claim 24, wherein the web site hosts a collaboration application that allows users to remotely participate in the development of load tests.

26. The system of claim 24, wherein the web site hosts a registration application that provides functionality for users to register to use the plurality of load testing servers to load test target server systems.

27. The system of claim 24, wherein the database stores load testing data for each of a plurality of customers of a load testing service associated with the plurality of load testing servers, and the web site provides each such customer secure access to the load testing data of that customer.

28. A system that provides functionality for remotely load testing target server systems over a wide area network, the load testing system comprising:

a plurality of load testing servers connected to the wide area network, said load testing servers hosting a load testing application that provides functionality for applying a load to a target server system over the wide area network and for monitoring response times of the target server system during application of said load;

a controller that provides functionality for controlling the plurality of load testing servers over a network connection to execute load tests of the target systems;

a database that is accessible to the plurality of load testing servers, the database storing test scripts that specify user transactions for load testing specific target server systems, and storing target system performance data generated by the load testing servers during execution of load tests; and a web site that provides secure access to at least some of the data stored in the database to enable users to remotely participate in load testing of the target server systems, wherein the web site hosts a collaboration application that allows users to remotely participate in the development of load tests.

29. The system of claim 28, wherein the web site hosts a registration application that provides functionality for users to register to use the plurality of load testing servers to load test target server systems.

30. The system of claim 28, wherein the database stores load testing data for each of a plurality of customers of a load testing service associated with the plurality of load testing servers, and the web site provides each such customer secure access to the load testing data of that customer.

31. A system that provides functionality for remotely load testing target server systems over a wide area network, the load testing system comprising:

a plurality of load testing servers connected to the wide area network, said load testing servers hosting a load testing application that provides functionality for applying a load to a target server system over the wide area network and for monitoring response times of the target server system during application of said load;

a controller that provides functionality for controlling the plurality of load testing servers over a network connection to execute load tests of the target systems;

a database that is accessible to the plurality of load testing servers, the database storing test scripts that specify user transactions for load testing specific target server systems, and storing target system performance data generated by the load testing servers during execution of load tests; and a web site that provides secure access to at least some of the data stored in the database to enable users to remotely participate in load testing of the target server systems, wherein the web site hosts a registration application that provides functionality for users to register to use the plurality of load testing servers to load test target server systems.

32. The system of claim 31, wherein the database stores load testing data for each of a plurality of customers of a load testing service associated with the plurality of load testing servers, and the web site provides each such customer secure access to the load testing data of that customer.

33. A system that provides functionality for remotely load testing target server systems over a wide area network, the load testing system comprising:

a plurality of load testing servers connected to the wide area network, said load testing servers hosting a load testing application that provides functionality for applying a load to a target server system over the wide area network and for monitoring response times of the target server system during application of said load;

a controller that provides functionality for controlling the plurality of load testing servers over a network connection to execute load tests of the target systems;

a database that is accessible to the plurality of load testing servers, the database storing test scripts that specify user transactions for load testing specific target server systems, and storing target system performance data generated by the load testing servers during execution of load tests; and a web site that provides secure access to at least some of the data stored in the database to enable users to remotely participate in load testing of the target server systems;

wherein the database stores load testing data for each of a plurality of customers of a load testing service associated with the plurality of load testing servers, and the web site provides each such customer secure access to the load testing data of that customer.

* * * * *